United States Patent

[15] 3,679,053

Koulovatos et al. [45] July 25, 1972

[54] BATCH SEWAGE TREATMENT SYSTEM

[72] Inventors: James Koulovatos, Brunswick; Kenneth L. Thomas, Portland, both of Maine

[73] Assignee: Pollution Control Products, Inc., Portland, Maine

[22] Filed: July 27, 1970

[21] Appl. No.: 58,475

[52] U.S. Cl. .............................. 210/86, 210/104, 210/115, 210/124, 210/138, 210/197, 210/202, 210/220
[51] Int. Cl. ........................................................ B01d 21/24
[58] Field of Search .................... 210/86, 104, 109, 114, 115, 210/124, 138, 139, 143, 259, 250, 197, 202, 220

[56] References Cited

UNITED STATES PATENTS

| | | | |
|---|---|---|---|
| 3,419,146 | 12/1968 | Koulovatos | 210/138 |
| 1,800,517 | 4/1931 | Foster | 210/104 |
| 3,342,727 | 9/1967 | Bringle | 210/143 X |
| 3,355,019 | 11/1967 | Mitchell | 210/104 |
| 3,563,382 | 2/1971 | Regent | 210/104 |
| 2,777,815 | 1/1957 | Forrest | 210/260 X |

*Primary Examiner*—John Adee
*Attorney*—Robert Shaw

[57] ABSTRACT

An aerobic batch sewage treatment system to receive raw sewage mixed with water and adapted to reduce the size of the sewage while simultaneously exposing it to oxygen to initiate aerobic activity. The system includes three tanks, an air lift pump within the first tank being adapted to transfer the sewage in the form of a slurry from the first tank to a second tank which serves as a settling tank, the level of sewage in the second tank being maintained between high and low limits. Ceramic diffusers are provided within the second tank below the low limit level of sewage therein to receive air from a blower to aerate the sewage. A third tank is connected to receive substantially pure liquid by gravity feed from the second tank and valve means is furnished within the second tank and connected to control flow of liquid between the second and third tanks; the active portions of the valve means which receive and control the liquid flow are located at all times below said low limit to prevent accumulation of oxidized sewage particles on said active portions and to keep such particles out of the connecting pipe between the tanks.

11 Claims, 7 Drawing Figures

Inventors
James Koulovatos
Kenneth L. Thomas
by Robert Shaw
Attorney

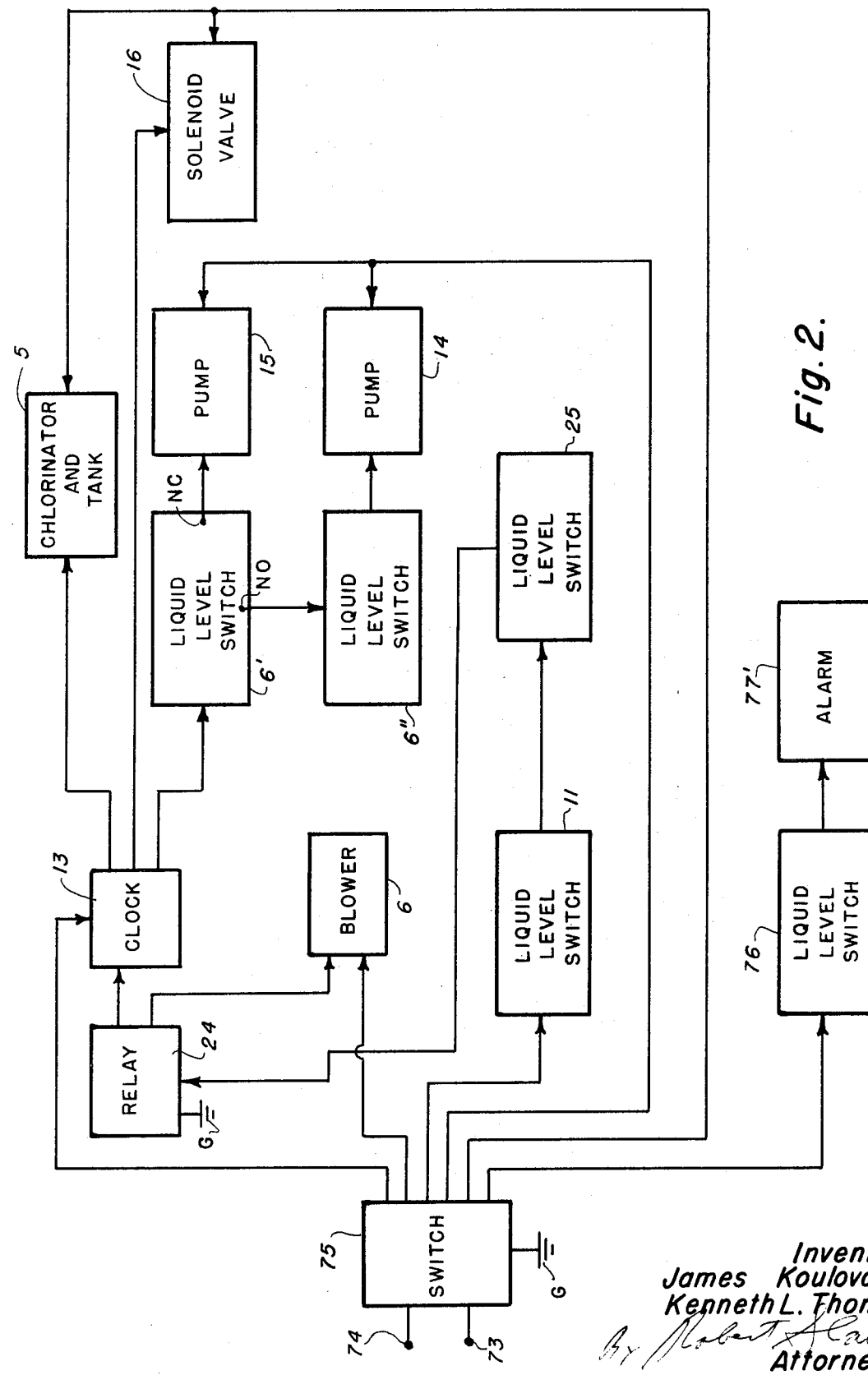

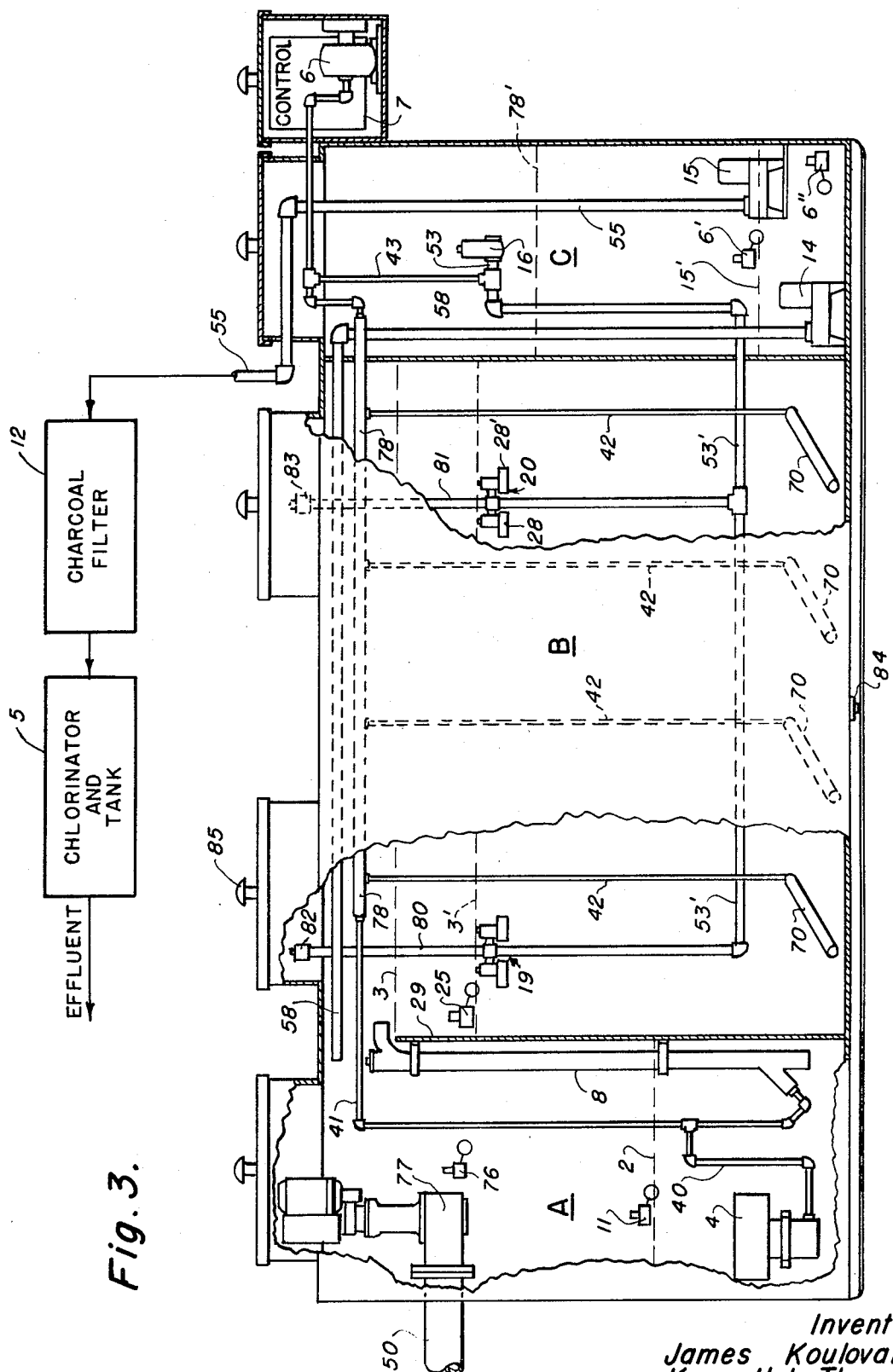

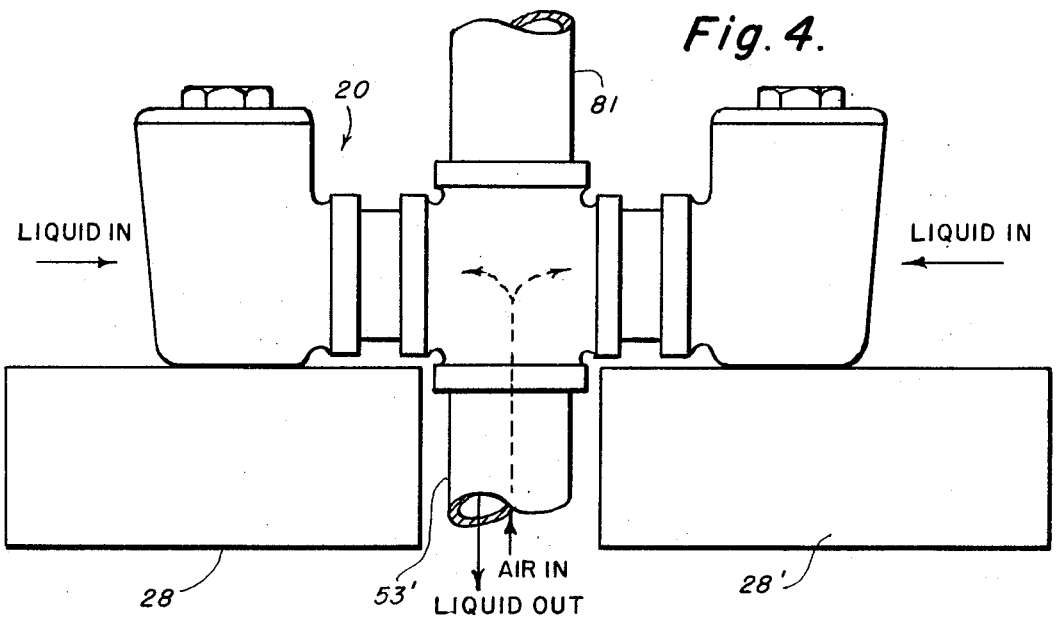
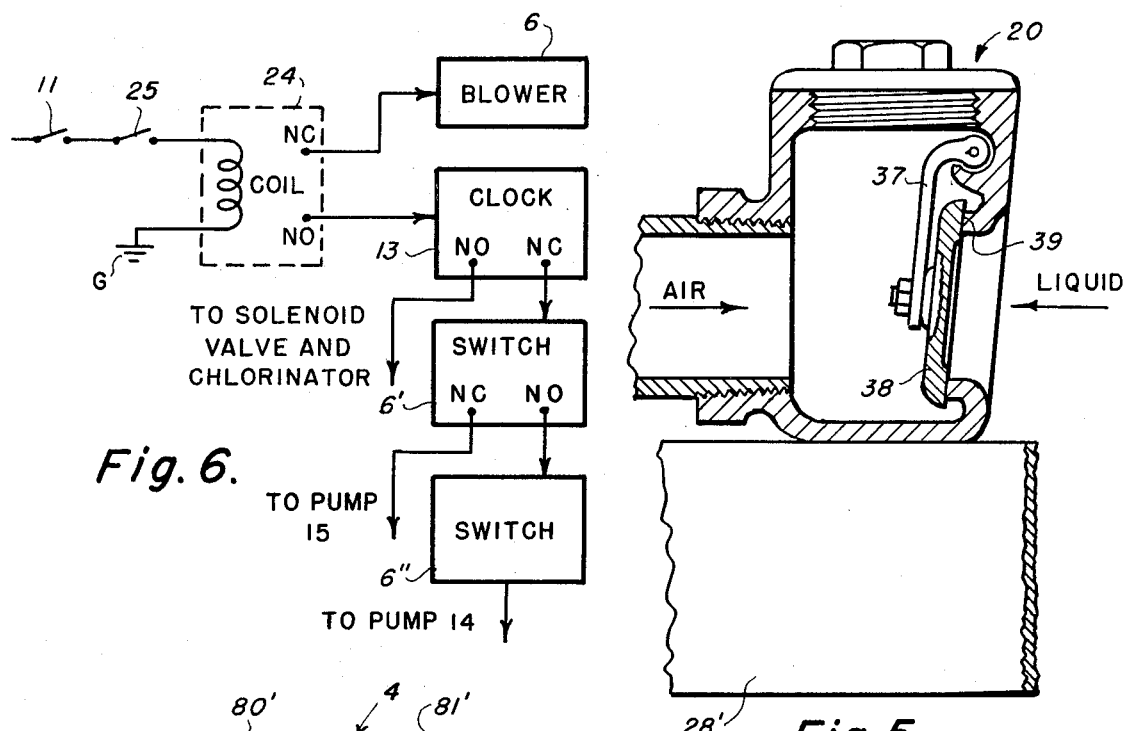
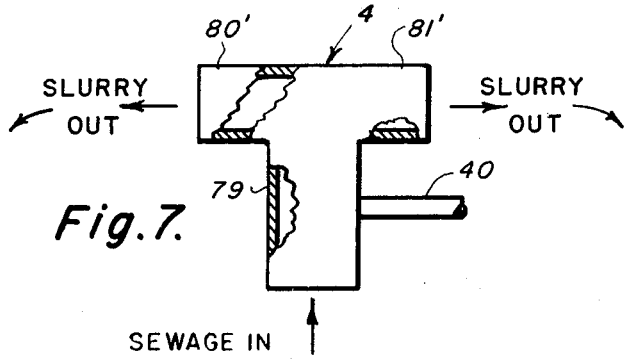
Inventors
James Koulovatos
Kenneth L. Thomas

BATCH SEWAGE TREATMENT SYSTEM

The present invention relates to aerobic sewage treatment systems.

As a consequence of efforts, particularly of recent times, to prevent pollution of streams, lakes and other bodies of water, there have been enacted, or more rigidly enforced, laws with regard to dumping waste materials into drain water. Such laws as applied to smaller establishments such as individual residences, hotels, schools, motels and the like have led, particularly in rocky environments, to the need for aerobic-type sewage treatment systems, and to systems which can function untended for long periods of time without failure and with a minimum of mechanism difficulties. Such difficulties include valve failure, for example, or total failure of parts of the system. The valve problem is particularly trouble-some because in prior apparatus such valves are subjected alternately to deposition of oxidizable material on their working parts and then to periods of oxidization. The deposits of foam and scum build up until, eventually, failure occurs.

An object of the present invention is to provide an electric-powered aerobic sewage treatment plant or system which shall be suitable for use to treat sewage output from individual residences, motels and the like.

A further object is to provide a system which shall be relatively maintenance free and, more particularly, one in which the valves that are most apt to be affected by foam and scum are removed from the region of such foam and scum.

In addition, it has been found that previously available apparatus have failed in operating systems, to remove enough of the solid matter from sewage to comply with purity of discharge required by some governmental authorities. It has been found for present purposes that one of the main reasons for such failure is that in prior systems solid waste is transferred from the settling tank of the system and, finally, to the discharge thereof. Still another object, therefore, is to provide a system which minimizes transfer of particulate matter from the settling tank of the system, and which further provides, to meet particularly high purity standards in certain situations, for secondary settling prior to discharge.

Other and still further objects are discussed in the following description and are particularly delineated in the appended claims.

The foregoing objects are attained in an aerobic batch sewage treatment system having a first tank to receive raw sewage mixed with water and an air comminutor disposed within the tank and adapted to reduce the size of sewage therein while simultaneously exposing it to oxygen to initiate aerobic activity. An air lift or other pump is provided within the first tank to transfer the comminuted sewage as a slurry from the first tank to a second tank which serves as an aeration and settling tank, the level of sewage in the second tank being maintained between high and low limits, the high limit being determined by a weir disposed between the first and second tanks and adapted to allow sewage above a predetermined level in the second tank to flow back to the first tank during the course of air lifting until the level of sewage in the first tank reaches a predetermined level. An air blower is connected to furnish pressured air for the comminutor, the air lift pump and ceramic diffusers. The diffusers are located in the second tank below the low limit level of sewage therein to receive air from the blower and disseminate same throughout the liquid, thereby to aerate the sewage. A third tank is connected to receive substantially pure liquid from the second tank. Valve means are located within the second tank and connected to control the flow of liquid between the second and third tanks; the active portions of the valve means which receive and control the liquid flow are located at all times below said lot limit to prevent accumulation of oxidized sewage particles on said active portions and to exclude such particles from the pipe which serves as a conduit for liquid flow between the second and third tanks.

The invention will now be explained with reference to the accompanying drawing in which:

FIG. 2 is a block diagram of electric circuitry associated with the system of FIG. 1;

FIG. 3 is a side elevation view, partially cutaway, of apparatus embodying the elements shown in FIG. 1 and including two double-ended air valves and an air-driven comminutor;

FIG. 4 is an expanded scale side view of one of the double-ended normally closed air valves of FIG. 3;

FIG. 5 is a sectional side view and on a further expanded scale of a portion of the right-end valve of the double-ended valve shown in FIG. 4;

FIG. 6 is a schematic block circuit diagram to show sequencing of the circuit elements of FIG. 2; and FIG. 7 is a side view, partially cutaway, of the comminutor shown in FIG. 3.

Figure 1:
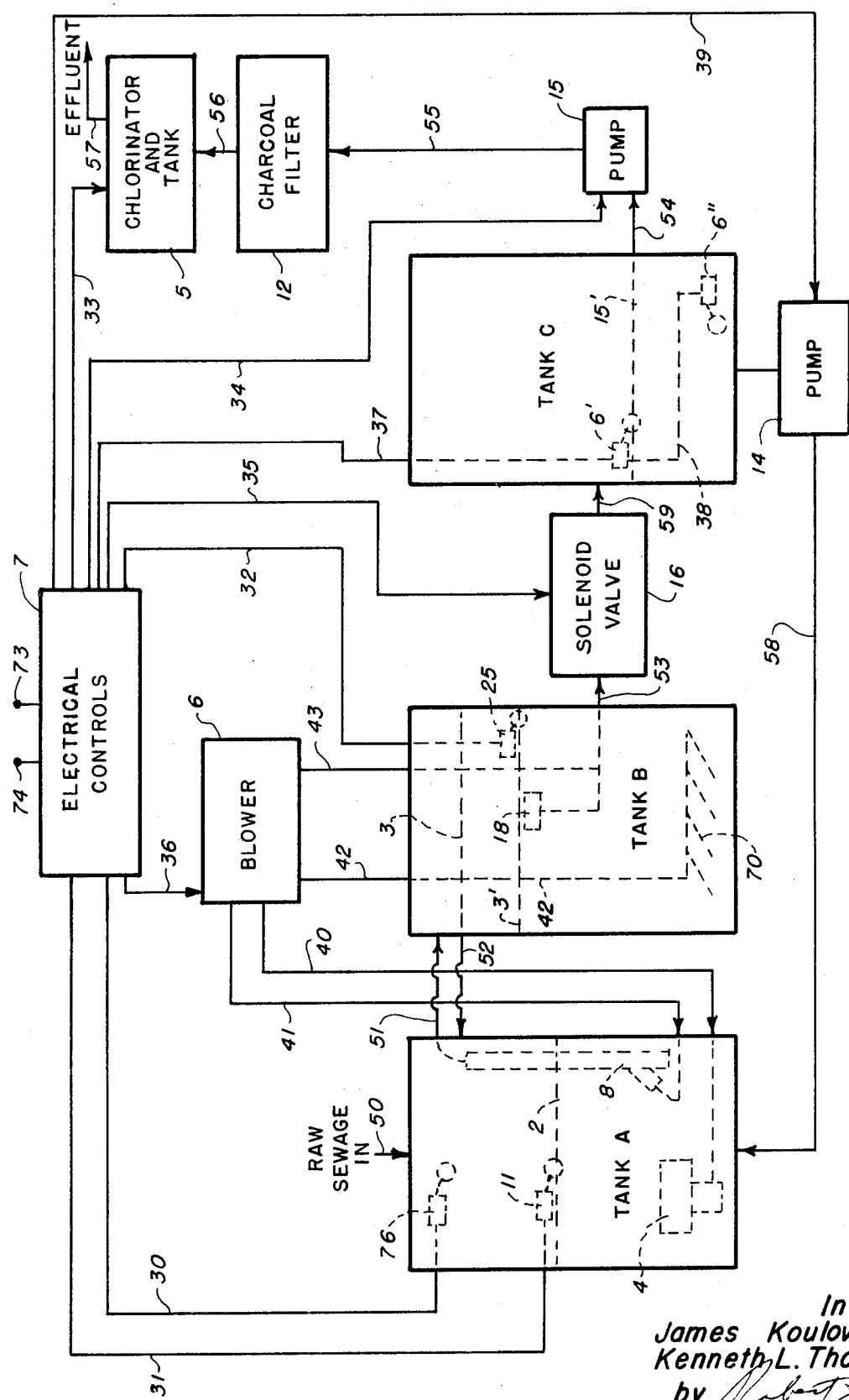
FIG. 1 is a block diagram of an aerobic sewage treat-ment system of the present invention.

Before discussing the batch-type sewage treatment apparatus of the present invention in detail, it is in order to discuss the overall operation. The system, as shown in FIG. 1, includes three main tanks A, B and C; the first tank A to receive raw sewage mixed with water, the second tank B which acts as an aeration or oxidizing and settling tank, and the third tank C to receive liquid discharge from the tank B and, in the preferred embodiment, allow secondary settling Liquid in the tank C, after the secondary settling period, is removed by a pump 15 down to a predetermined level 15' (to say 12 inches from the tank bottom), and a second pump 14 at the bottom of the tank C removes substantially all the remainder of the liquid from the third tank, the output of the pump 14 being piped (as shown in FIG. 1) to return liquid and particulate matter from the bottom of the tank C to tank A. The pump 15 output can be connected through a charcoal filter 12 to a chlorinator tank 5 for further purification, or to waste.

The block diagram in FIG. 1 contains a number of elements that can be categorized as electrical, others are mechanical, and still others concern an air pressurized system, and the drawing lines, in turn, represent connections between one or the other of the categories. In order to eliminate any possible confusion, each drawing line is numbered. The drawing lines 30, 31, 32, 34, 35, 36, 33, 37, 38 and 39 represent electrical connections; the drawing lines 40, 41, 42 and 43 represent air tubing adapted to carry pressurized air; and the drawing lines 50, 51, 52, 53, 54, 55, 56, 57, 58 and 59 represent liquid carrying pipes. The further elements in the figure are discussed elsewhere herein.

The raw sewage is pulverized by an air driven comminutor 4 which is immersed in the sewage and water near the bottom of the tank A. The comminutor, as hereinafter discussed, is adapted to keep the sewage slurry formed by its comminuting action in a continuous state of agitation while introducing air thereto to accelerate the aerobic activity by which this sewage is decomposed in the present apparatus. During this cycle of the operation the slurry is pumped continuously by an air lift pump 8 to the second tank B which serves initially as an aeration tank. In the simplified block diagram illustration of FIG. 1, the transfer of slurry from Tank A to tank B is represented by the arrow labeled 51. An arrow 52 represents a return flow from the tank B to the tank A when the level of slurry in the tank B reaches the level designated 3 in FIG. 3. Prior to the level 3 being reached the air lift pump 8, as a general rule, removes slurry from the tank A at a rate of at least as fast and usually faster than the rate of input sewage to the tank, and, thus, the liquid level within the tank A is determined by the input location at the lower part of the air lift pump 8. When the level 3 is reached, the level within the tank A increases with any influx of sewage (i.e. influent) until a predetermined level 2 is reached in the tank A, the level 2 being below the level 3. When the level 2 is reached, a liquid level float switch or sensor 11 sends a signal to an electric control 7. Signals from the control 7 remove electric power from the blower 6 and simultaneously a clock 13 within the control is energized to commence a settling cycle (typically about thirty minutes), as later discussed. During the settling cycle the discharge pumps 14 and 15, which are controlled by the clock 13, remove liquid from the tank C, as discussed elsewhere herein, and a normally closed solenoid valve 16, also controlled by the clock, as later discussed, is closed. The pump 15, when energized, lowers the liquid to the level 15', as before mentioned, at which time the liquid level switch 6' changes contacts to effect opening of the electric circuit to the pump 15 and closing of the electric circuit to the pump 14 to return any bottom sludge to the tank A. The valve 16 is disposed in a pipe 53—53 connecting the tanks B and C and is adapted to prevent the flow of liquid therebetween when electrically de-energized. At the end of the settling cycle the pump 14 (unless it is de-energized sooner by a liquid level switch 6'') is de-energized and the valve 16 is opened. The flow of liquid in the pipe 53—53 is controlled by the solenoid valve 16 at the tank C end thereof and at the end thereof and at the tank B and by a plurality of air controlled valves, represented by the block designated 18 in FIG. 1, and discussed in detail in a later paragraph. When the valves 18 and the valve 16 are open, liquid can flow by gravity feed from the tank B to the tank C, and such flow continues until a predetermined low level 3' in the tank B is reached as determined by a liquid level switch or sensor 25.

Sequencing of the system is best shown in FIG. 6. The initial condition of operation, which may be termed the filling cycle, is one in which the switch 25 is closed and the switch 11 open; the blower 6 is, therefore, energized and the clock system de-energized. Upon the level 2 being attained in the tank A, the switch 11 closes, the blower 6 is de-energized, and the clock 13 is energized. The clock normally open (n.o.) and normally closed (n.c.) contacts shown are not affected at this juncture, but are, rather, respectfully closed and opened at the end of a predetermined period of time (which is the 30 minute settling period before mentioned). At the end of the settling cycle the circuit to the pumps 14 and 15 is opened, the circuit to the solenoid valve 16 is closed (thereby opening the valve which is spring closed), and the circuit to a chlorinator in the tank 5 is closed causing it to discharge a chlorine compound into the tank. At this juncture, since the valves 18 are open, liquid will flow under the influence of gravity through the pipe 53'—53 to the tank C until a low liquid level in the tank B is reached at which the liquid level switch 25 is opened, thereby de-energizing the relay 24, energizing the blower 6, and de-energizing (and thereby resetting) the clock 13 to recycle the system.

The valves represented by the block 18 are shown in FIG. 3 as two double-ended normally closed valves 19 and 20, the valve 20 being shown in greater detail in FIGS. 4 and 5. The active portions of the valves 19 and 20 are located at all times below the level of liquid in the tank B to prevent accumulations of sewage solids on said active portions with subsequent oxidation of the solids and failure of the valves because it either becomes impossible for the valves to seat or the passages therethrough become clogged. In addition, any scum at the surface of the slurry in the tank B does not pass into the continuously submerged valves 19 and 20 and, so, to the tank C. The valves 19 and 20 are air valves, each having a diaphragm 38 supported by pivotal holder 37 (see FIG. 5) and adapted to seat against head pressure of liquid in the tank B on an annular shoulder 39 at each inlet under the influence of air pressure. The valve 20, for example, has two such diaphragms, each adapted under the influence of air to close one side of the double-ended valve, i.e., to move to the right in FIG. 5. The air pressure is introduced into the liquid pipe 53' which, as shown, is merely an extension of the line 53 back in the direction of the tank B, through an air line 43 from the blower 6. Since, at the time that air pressure is introduced into the pipe 53', the valve 16 is closed, there is a buildup of air pressure behind the two diaphragms of each of the valves 19 and 20, and the valves 19 and 20 are thereby closed against the head pressure of water to prevent liquid flow into the pipe 53'. Following the settling cycle the normally open contact in the clock 13 is closed thereby completing the solenoid circuit of the valve 16 and the latter opens the fluid line 53 at the tank C entrance to allow liquid to flow from the tank B to the tank C. The tank B thus discharges into the tank C until the switch 25 opens. As mentioned above, it is essential that the active elements of the valves 19 and 20 be at all times below the lowest level of the liquid in the tank B, and this is accomplished by the low level switch 25 which, upon opening, recycles the system, as above mentioned, the valves 19 and 20 being closed in the process. It has been found for present purposes that the continuous immersion of the valves 19 and 20 prevents sludge present at the surface of the liquid in the tank B from ever coming into contact with the valves 19 and 20 or from being carried into the pipe 53'—53 to the valve 16 and the tank C. The valves 19 and 20 must be kept above the level of settled sludge accumulation at the bottom of the tank B. The high level of liquid in the tank B is controlled by a weir 29 between the tanks A and B. In order to prevent any stirring due to vortex effect of water entering the inlet to the valves 19 and 20, a pair of vertically oriented plates such as, for example, the plates numbered 28 and 28' are provided under the inlet opening at each end of each of the double-ended valves.

As above mentioned, aeration to supply oxygen for aerobic action is initially furnished by the air injected through the comminutor 4. The largest part of aerobic action takes place in the tank B, however, air being injected to the sewage there through a plurality of ceramic diffusers 70 connected by a common air chamber or air manifold 78 to the blower 6, the diffusers 70 being disposed at intervals and oriented at about 30° to the walls of the cylindrical tank B to create a rolling action of the fluid within the tank, thereby to effect intimate contact between the injected air and all the small sewage particles within the tank. In that way, the living organisms, which performs the digestive process by which aerobic decomposition of waste is effected, are presented with a continuous supply of oxygen. The greatest amount of decomposition, as mentioned above, occurs in the tank B; however, the reverse flow of fluid from the tank B to the tank A over the weir 29 acts to seed the tank A so that some decomposition takes place there, also. Following the aeration cycle, the blower is de-energized and the settling cycle occurs; the solenoid valve 16 is maintained in the closed condition; the valves 19 and 20 are opened; and the discharge pump 15 is energized to bring the level of fluid in the tank C down from the level designated 78' in FIG. 3 to the level 15', as determined by the liquid level switch 6' which connects to the pump through a normally closed (n.c.) contact. The switch 6' n.c. contact then opens and its n.o. contact closes completing a circuit through the switch 6'' to the pump 14 which takes the tank C to zero level, at which level the switch 6'' opens. Following the typically 30-minute settling cycle, the solenoid valve 16 is opened thereby allowing fluid to flow through the open valves 19 and 20 into the tank C until a liquid level in the tank B is reached at which the switch 25 is opened. Upon that occurrence, the solenoid valve 16 closes and the blower is activated thereby closing the valves 19 and 20 and repeating the comminuting and aeration cycle. The system described herein is termed "batch." Thus, all during the settling cycle sewage is received by the tank A but is not acted upon until the switch 25 is opened, at which time the comminutor 4, airlift 8, and aerators 70 are activated by air pressure from the blower 6.

The comminutor 4, as best shown in FIG. 7, is a T element having a vertical cylindrical pipe 79 (about 4 inches in diameter and 10 inches long in typical apparatus) into which air under pressure is injected through the pipe 40 disposed about half the distance between the ends of the pipe member 79. The arms of the T comprise members 80' and 81' which direct the sewage particles and fluid horizontally and out as indicated.

A part of the electrical circuitry shown in FIG. 2 is discussed elsewhere herein; the discussion in the present paragraph serves to bring the electrical circuitry together and to include those elements not mentioned elsewhere. Electric power (120 or 240 volts a.c., usually) to the system is connected to a pair of terminals 73 and 74 of a switch 75. One side of the switch 75 is shown grounded at G. The blower 6, the solenoid valve 16 and chlorinator in the tank 5 are shown in FIG. 2 connected to receive electric power from the output of the switch 75 and control signals from the relay 24 and clock 13. The control signals in actual apparatus are fed into solenoid-controlled switches (not shown) which act to connect and disconnect power to the respective circuit elements during system cycling. The relay 24 contains a normally closed contact connected to control the blower circuitry and a normally open contact connected to control the clock circuitry, as shown in FIG. 6. Thus, when the relay 24 is energized, the blower 6 is de-energized and the clock 13 is energized or set. The clock, in turn, has a normally closed contact controlling the discharge pumps 14 and 15 and a normally open contact controlling the chlorinator and the solenoid 16. As shown in FIG. 2, the foregoing elements can be de-energized by opening the switch 75 or by opening the circuits to the individual elements of the circuit through control signals, as mentioned. In the event that the apparatus becomes overloaded with sewage due to a failure of one or more parts of the system, a further liquid level switch 76 is furnished to actuate an alarm 77', or the switch 76 can be connected to some other device, as may be required.

Cleanout pipes 80 and 81 allow removal of any sediment from the valves 19 and 20, respectively, by removal of caps 82 and 83, respectively. In general, aerobic action disposes and decomposes most of the bulk sewage, the products of such decomposition being $CO_2$ and water, the former of which escapes through vents such as the vent labeled 85. Periodic cleaning of the tanks can be effected to remove any accumulation of sludge which may occur by one or more cleanout plugs such as, for example, the plug shown at 84. The inlet to the air-lift pump 8 is at the opposite side of the tank A from the influent inlet to reduce the possibility of initial influent getting into the pump, and the comminutor is located closer to the input side. The continual flow over the weir 29 during a portion of the aerobic cycle has the effect, in addition to providing seeding of tank A, of returning any particle scum from the top of the tank B to the tank A for further comminution and aeration.

A few other matters not previously discussed are contained in this paragraph. In the illustrative embodiment an air lift pump is shown, but in larger-sized systems an electric motor driven mechanical pump is used. Also, an electric motor driven comminutor, as shown at 77, is used at the inlet to the tank A in larger systems or systems which receive solid sewage which cannot be reduced by the air comminutor. In FIG. 3, the inlet to the air lift pump 8 is shown at about the same level as the inlet to the comminutor 4; preferably the lift inlet should be slightly above the comminutor inlet to prevent reduction of air pressure in the system. The activated charcoal filter 12 removes phosphates, organics not previously removed, and other material. It should be noted, however, that liquid entering the filter 12 must be substantially free of particulate matter; otherwise the filter will become clogged in a short time and, indeed, such a filter cannot be used in the absence of a system in which most of the solid matter is removed ahead of the filter. The removal of phosphates is facilitated by placing a lime or iron sulphide filter ahead of the carbon filter 12 to unite phosphates which then settle out in the carbon filter. The carbon filter used in operable apparatus has two filter cartridges, one such cartridge only being used at any particular time. When the cartridge in use begins to clog by solids accumulation, pressure builds up behind the filter cartridge in use; and beyond some predetermined high pressure a pressure switch, not shown, switches fluid flow from the first to the second cartridge and sounds an alarm. The tank 5 may contain ozone producing radiation sources or ultraviolet radiation sources to effect additional purification or an alternate to chlorination thereby eliminating periodic checks of chlorination equipment and tank corrosion; and, if such ozonation or ultraviolet radiation is used as a further purifying means, the liquid in the tank 5 must be free of most of the particulate matter in order to allow the radiation to penetrate--and that is the case when the within described apparatus is used. The pumps 14 and 15 are preferably submersible and the liquid level switches 6' and 6'', which are shown as float types for present purposes are, in operable apparatus, diaphragm-type switches with microswitch contacts within a common housing with the respective pump and electric drive motor. The low liquid level switches 11, 25 and 76 are, similarly, diaphragm devices. In some systems chlorination is provided in the tank C.

Modification of the invention herein described will occur to persons skilled in the art.

What is claimed is:

1. An aerobic batch sewage treatment system comprising, in combination, a first tank to receive raw sewage mixed with water, an air comminutor disposed within the first tank and adapted to reduce the size of sewage therein while simultaneously exposing the sewage to oxygen to initiate aerobic activity, a lift pump within the first tank adapted to transfer the comminuted sewage from the first tank to a second tank which serves as an aeration and settling tank, the level of sewage in the second tank being maintained between high and low limits, the high limit being determined by a weir disposed between the first and second tanks and adapted to allow sewage above a predetermined level in the second tank to flow back to the first tank during the course of pumping until the level of sewage in the first tank reaches a predetermined high level, a source of pressured air for the comminutor, ceramic filters within the second tank below the low limit level of sewage therein to receive air from said source and disseminate same throughout the liquid thereby to aerate the sewage, a third tank connected to receive substantially pure liquid from the second tank and valve means disposed within the second tank and connected to control flow of liquid between the second and third tanks, the active portions of the valve means which receive and control the liquid flow being located at all times below said low limit and above the level of any settled particulate matter therein to prevent accumulation of oxidizing sewage particles on said active portions.

2. A sewage treatment system as claimed in claim 1 in which the valve means comprises a plurality of air valves which when open allow liquid to flow between the second and third tanks, the valves being normally closed and being closed by air pressure.

3. A sewage treatment system as claimed in claim 2 in which the pump is an air lift pump and in which air valves and the ceramic filters are connected by a common air line to the source of air, thereby to affect closure of said valves during the period of time that sewage in the second tank is being aerated.

4. A sewage treatment system as claimed in claim 3 in which the active portions of each of the air valves comprise a diaphragm, one side of which diaphragm is adapted to seat upon an annular shoulder of the valve and the other side of which is connected to the air line, the diaphragm being forced upon the occurrence of air pressure in said line to seat upon said shoulder and close the valve.

5. A sewage treatment system as claimed in claim 4 and having an electrical control adapted to connected to a source of electric power and to connect and disconnect electric power to electric components in the system.

6. Apparatus as claimed in claim 5 which includes a liquid level sensor in the first tank adapted to provide an electric signal to a relay in the control means when the liquid level in said first tank reaches said predetermined high level.

7. Apparatus as claimed in claim 6 which includes a second liquid level sensor in the second tank adapted to provide an electric signal to said relay at a predetermined low liquid level in said second tank.

8. Apparatus as claimed in claim 7 in which the connecting means between the second and third tank is a pipe adapted to carry liquid therebetween by gravity flow, the air valves controlling flow through the pipe at the inlet end and a spring actuated solenoid valve controlling flow at the outlet end thereof.

9. Apparatus as claimed in claim 8 having a high level liquid switch in the first tank to sense levels of liquid above said predetermined high level and to actuate an alarm and the like upon such occurrence.

10. An aerobic batch sewage treatment system comprising, in combination, a first tank to receive raw sewage mixed with water, a comminutor disposed within the tank and adapted to reduce the size of the sewage therein, means for transferring the comminuted sewage as a slurry from the first tank to a second tank which serves as an oxidizing and settling tank, means for maintaining the level of sewage in the second tank between high and low limits, means for introducing oxygen to the slurry, a third tank connected to receive substantially pure liquid formed by aerobic action and subsequent settling of particulate matter from the slurry from the second tank, and valve means disposed within the second tank and connected to control flow of liquid between the second and third tanks, the active portions of the valve means which receive and control the liquid flow being located at all times below said low limit to prevent accumulation of oxidized sewage particles on said active portions and minimize transfer of particles from the second tank to the third tank, said third tank providing secondary settling and having first pump means connected to remove liquid from the third tank down to a predetermined level in said third tank and second pump means connected to remove substantially all the remainder of the liquid from the third tank, the output of the second pump means being piped to return liquid and particulate matter that accumulates at the bottom of the third tank to the first tank.

11. Apparatus as claimed in claim 10 in which the output of the first pump means is piped to an activated charcoal filter and then to a chlorinator and/or ozonation tank.

* * * * *